Patented July 8, 1941

2,248,113

UNITED STATES PATENT OFFICE 2,248,113

MEDICINAL COMPOSITION

Cyrus F. Newcomb, Champaign, Ill.

No Drawing. Application July 11, 1938,
Serial No. 218,631

2 Claims. (Cl. 167—58)

The present invention relates to a medicinal composition containing esters of complex organic acids. More specifically the present invention relates to a composition containing substantial amounts of alkyl esters of chaulmoogric acid and cinnamic acid.

The object of the present invention is to administer concentrated doses of ethyl cinnamate by using as a carrier or solvent therefor ethyl chaulmoograte, the latter also having therapeutic advantages.

While it is well known that ethyl cinnamate is highly valuable as a medicinal agent, and especially for the treatment of tuberculosis, it has not been possible to administer ethyl cinnamate in concentrated form. Prior to the present invention, it was customary to suspend the ethyl cinnamate in olive oil or in olive oil to which benzyl alcohol has been added. While the use of a carrier agent such as benzyl alcohol and olive oil is somewhat of an improvement, this carrier does not permit the administration of the ethyl cinnamate in concentrated form. In accordance with the present invention, ethyl chaulmoograte is utilized as a solvent for the ethyl cinnamate, thus making possible the administration of highly concentrated doses of the ethyl cinnamate.

The composition of the present invention comprises a mixture of ethyl chaulmoograte and ethyl cinnamate. Ordinarily the preferred composition is made up of equal proportions of ethyl chaulmoograte and ethyl cinnamate, although the proportions of the individual esters may vary from about 25 to 75 percent.

Chaulmoogra oil obtained from the seeds of *Gynocardia odorata* or *Taraktogenos kurzii* of India contains a mixture of chaulmoogric, gynocardic and hydnocarpic acids. This oil containing the mixed acids has been used to some extent heretofore medicinally in the treatment of leprosy and certain type skin diseases.

The chaulmoogra oil is a satisfactory source for ethyl chaulmoograte and the ester may be prepared therefrom by various methods known to the art. Briefly, one of the preferred methods includes the following steps: saponification of chaulmoogra oil by treatment with sodium hydroxide, addition of a mineral acid to free the chaulmoogric acid and the recovery of the chaulmoogric acid by filtration, addition of ethyl alcohol and sulphuric acid to the chaulmoogric acid and the refluxing of the mixture for about 4 or 5 hours, fractional distillation of the reaction product which has been washed with water and the recovery of the ester at 191°–198° C. at 5 mm. pressure. Care should be exercised in the preparation of the ethyl chaulmoograte to insure that the ester is free from gynocardic acid and is substantially chemically pure. The other ester, i. e. ethyl cinnamate, used in the present invention may also be prepared by known methods or purchased as the C. P. ester on the open market.

The mixed esters of the present invention when tested in vitro have been found to prevent the growth of tubercle bacilli in dilutions as low as 1:1000000. The esters have the characteristics of oil e. g. non-aqueous, and for this reason come in intimate contact with tubercle bacilli which are waxy in nature. Examinations of the tubercle bacilli, for example, have shown the bacilli to be water repellant.

The composition of the present invention is of particular aid in the treatment of infections caused by mycobacterium tuberculosis. The esters, for example, may be applied externally in the treatment of osteomyelitis. The composition may also be used intra-muscularly but is not adaptable for oral administration. After an injection which is ordinarily limited to 3–10 cc. per week, the patients develop a fever of about 100–100.5° F., accompanied, in most cases, by a mild blush. The injections also produce leucocytosis, i. e. stimulate white corpuscle growth. Tests have shown the leucocyte standard of 8000–9000 to increase about 50 percent or around 12,000 after an injection of the ethyl esters of chaulmoogric and cinnamic acids. The advantages of a composition capable of stimulating the growth of leucocytes combined with the property of preventing or retarding the growth of waxy bacilli will be obvious to those skilled in the art.

Although the invention described herein has been illustrated with certain specific examples, it will be understood by those skilled in the art that the claims appended hereto are intended to cover all patentable equivalents falling within the scope and teachings of the present invention.

I claim:

1. A composition consisting of 25 to 75 percent ethyl chaulmoograte and 75 to 25 percent ethyl cinnamate.

2. A medicinal composition consisting of a mixture containing about equal parts of ethyl chaulmoograte and ethyl cinnamate.

CYRUS F. NEWCOMB.